United States Patent Office 2,890,172
Patented June 9, 1959

2,890,172

SOLUBLE OIL COMPOSITIONS OF IMPROVED EMULSIFICATION AND DISPERSION AT LOW TEMPERATURES

Allan A. Manteuffel, Crystal Lake, and George R. Cook, Des Plaines, Ill., assignors to The Pure Oil Company, Chicago, Ill., a corporation of Ohio No Drawing. Application October 6, 1955
Serial No. 539,003

8 Claims. (Cl. 252—33.3)

This invention relates to the art of formulating soluble oil compositions and relates particularly to improved emulsifiable cutting oil compositions and an improved method for forming the same. This invention is based on the discovery that the dispersion of soluble oil blends, composed of emulsifier, extender and mineral oil blended to a controlled free acidity, in water to form a soluble oil emulsion at low temperatures is greatly facilitated by the presence of certain amounts of the condensation product of a chlorinated wax and a phenol.

The art of making emulsifiable cutting oil compositions has developed to the point where improved multifunctional characteristics, including both lubrication and cooling in the proper balance, are attainable by incorporating in the formulation the proper proportions of mineral oil and emulsifiable base or soap along with a coupling agent or stabilizer. Although generally referred to as soluble oils, and this nomenclature will be followed in describing the instant invention, these materials ordinarily form an emulsion when mixed with water. In order to distinguish between the soluble oil mixture in its concentrate form and the emulsion which is produced when this concentrate is admixed with sufficient quantities of water, the former mixture will be referred to as the soluble oil blend, and the latter composition will be termed the soluble oil emulsion in describing this invention. The emulsion which is formed when the soluble oil blend is mixed with water is an intricate colloidal system of the oil-in-water type wherein the aqueous phase constitutes the continuous or dispersing phase and the mineral oil constituent is the dispersed phase.

A third and separate phase may be described as the oil-water interface and is a result of a delicately balanced chemical composition, partially soluble in the oil and partially soluble in the water phase. In the formulation of these soluble oils, considerable emphasis is placed upon the uniformity and the stability of the soluble oil emulsion. Although the emulsions formed are delicately balanced systems, and the components comprising the emulsifier, extender and mineral oil which are known in the prior art must be chosen with concinnity, there is a certain latitude in some of the ingredients that may be used. The emulsifier used in the soluble oils of this invention may consist of sulfonates, acid sludges, saponified phenols or naphthenic acids, sodium and potassium rosin soaps, amine salts of rosin acids, etc., either alone or in combination with these or other emulsifiers. Because of their effectiveness as emulsifiers, sulfonates are preferred. A proprietary composition known under the trade name of Petronate, comprising 62% sodium mahogany sulfonates prepared from petroleum, 5% water and 33% mineral oil, is preferred as the emulsifier for use herein. The average mol. wt. of the oil-free sulfonates is about 457.

To supplement the emulsifier used, it frequently is advantageous to employ extenders. This expedient permits adequate emulsification of the soluble oil with lesser amounts of costly emulsifiers. An example of an extender which may be employed in conjunction with the petroleum sulfonates of the present compositions is a liquid mixture of sodium or potassium salts of various processed rosins and resins, such as sodium resinate. Flextal 37, a proprietary compound comprising 37% abietic acid and 63% oleic acid, with minor amounts of linoleic and linolenic acids as contaminants, is the preferred extender when saponified.

The mineral oil component is generally a medium viscosity petroleum oil. This type of oil includes oils having various geographical origins such as Pennsylvania, Gulf Coast, and California. Although most oils may be used as the mineral oil constituent, Gulf Coastal oils are particularly acceptable. Also included as a component of the instant soluble oil blends is a coupling agent, or stabilizer, in the form of an alcohol, such as ethyl alcohol, or a poly-hydroxy alcohol, such as diethylene glycol or hexylene glycol. A mixture comprising 18.35% diethylene glycol and 81.65% hexylene glycol has been found to be a particularly suitable combination in the composition. The coupling agent, which is soluble in both the continuous phase and the dispersed phase of the emulsion, functions to stabilize the soluble oil blend.

In order to assist the coupling agent in providing a stable oil-in-water emulsion, control of the free acidity of the blend is necessary. This control is brought about by adjusting the acid content of the blend with an alkali, such as sodium or potassium hydroxide. It is this combination which controls the balance of the third phase hereinbefore referred to as the interface between the oil droplets and the water. This controlled combination also permits the use of the soluble oil blend in both hard and soft waters in the formation of the finished emulsion. Where heavy-duty cutting oils are desired, sulfurized or chlorinated extreme-pressure agents may constitute part of the soluble oil blend. Rust inhibitors, germicides, foam depressants, and additives for freeze-thaw stability may also be advantageously employed as ingredients in the composition.

It has been found that in the dispersion of soluble oil blends in water to form soluble oil emulsions, the formation of a stable emulsion at low temperatures is facilitated by incorporating in the soluble oil blend certain amounts of the condensation product of a chlorinated wax and a phenol. For this purpose the products described in United States Patents 2,191,499 and 2,147,545 may be used. Furthermore, it has been found that the finished emulsion formed from a soluble oil blend containing certain concentrations of the condensation product of a chlorinated wax and a phenol is more stable under a wider variety of conditions of storage and use.

Accordingly, a primary object of this invention is to provide an improved soluble oil composition containing certain critical amounts of a compound comprising the condensation product of a chlorinated wax and a phenol.

Another object of the invention is to provide a new method of emulsifying soluble oils at low temperatures.

These and other objects of the invention will become apparent as the description of the invention proceeds.

The present invention is best illustrated by a series of experiments which were carried out as follows:

EXPERIMENT I

Nine cc. of an acceptable soluble oil composition having the following composition:

| Component | Weight percent |
|---|---|
| Petronate | 4.87 |
| Flextal 37: | |
| 37% abietic acid | 3.02 |
| 63% oleic, linoleic, etc. | 1.41 |
| Diethylene glycol | 0.72 |
| Potassium hydroxide | 1.00 |
| Water | |
| Aromatic Extract Oil | 88.98 | was mixed with 90 cc. of water at 60° F. in a mixing vessel. After agitation for one minute a stable emulsion was formed. In a second experiment, a second portion of this composition, again 9 cc., was mixed with 90 cc. of water at 40° F. for five minutes. A stable emulsion could not be formed at this lower temperature.

EXPERIMENT II

Ninety-nine and a half gms. of the soluble oil blend of Experiment I were mixed with 0.5 gm. of the condensation product of a chlorinated wax and a phenol to form a stable soluble oil blend. Nine cc. of this augmented blend were mixed with 90 cc. of water at 35°–40° F. and a stable emulsion was formed in 15–30 seconds.

EXPERIMENT III

Ninety-nine and a half gms. of the soluble oil blend of Experiment I were mixed with varying amounts of the condensation product of a chlorinated wax and a phenol to form stable soluble oil blends. The pour points of these blends, the relative change in pour point and the ease of emulsification were observed and measured. The results are shown in the following table:

Table I

| Percent by wt. of Wax-phenol Cond. Prod. in Soluble Oil Blend of Exp. I | Pour Point, °F. | Change in Pour Point | Emulsification in water at 40° F. |
|---|---|---|---|
| 0.0 | +40 | 0 | none. |
| 0.05 | +35 | −5° | Do. |
| 0.10 | −10 | −45° | readily. |
| 0.20 | −15 | −5 | Do. |
| 0.30 | −25 | −5 | Do. |
| 0.40 | −25 | 0 | Do. |
| 0.50 | −30 | −5 | Do. |

The foregoing experiments show that the greatest lowering of the pour point occurs in going from a concentration of 0.05 to 0.10 weight percent and that further lowering of the pour point is small with concentrations of the wax-phenol above 0.10 wt. percent, although the improvement in ease of emulsification continues up to 0.5 wt. percent. Furthermore, the use of the wax-phenol condensation product in a soluble oil blend overcomes the problem of emulsification of the blend with water at temperatures from about 35° to 60° F. All of the blends showed good storage stability.

An aromatic extract oil is used in the soluble oil blend described in the foregoing experiments. This material, a by-product of lubricating oil manufacture, is commonly known and referred to in the art as solvent extract, or phenol extract, depending on the type of solvent used during the solvent extraction process. As described in our copending application, Serial Number 234,910, filed July 2, 1951, now abandoned, various solvent extracts from the manufacture of lubricating oils, wherein a lubricating oil is treated with a solvent having an affinity for the aromatic and cyclic, or naphthenic, constituents as opposed to the paraffinic hydrocarbons, may be used. Various solvents such as sulfur dioxide, phenol, nitrobenzene, furfural and the so-called Duo-Sol solution comprising liquid propane, phenol and cresol may be used to obtain from the lubricating oil the material described herein as solvent extract or phenol extract which is predominantly aromatic in character. Table II following sets forth the physical properties and source of various solvent extracts that may be used in accordance with this invention.

Table II
SOURCES AND PHYSICAL CHARACTERISTICS OF SOLVENT EXTRACTS

| Ext. No. | Crude Source | Oil Fraction Treated | Solvent | API Grav. | Vis./ 100° F. (SUS) | Vis./ 130° F. (SUS) | Vis./ 210° F. (SUS) | V. I. | °F. Pour | °F. Flash | Acid No. 1948 | Percent C. R. | Percent Sulfur |
|---|---|---|---|---|---|---|---|---|---|---|---|---|---|
| 1 | Van Zandt | Neutral | Phenol | 21.8 | 94.7 | 60.3 | 37.7 | +33 | +45 | | | | 1.48 |
| 2 | do | do | do | 14.1 | 351 | 142 | 47.1 | −22 | +40 | | | | 2.27 |
| 3 | do | do | do | 8.4 | 1,766 | 483 | 68.8 | −115 | +40 | | | | 3.10 |
| 4 | do | do | do | 12.9 | 901 | 301 | 61.5 | −16 | +30 | | | | 2.48 |
| 5 | do | do | do | 11.3 | 1,672 | 483 | 71.1 | −73 | +35 | | | | 2.65 |
| 6 | do | do | do | 10.5 | 12,676 | 2,514 | 172.1 | −101 | +60 | | | | 2.88 |
| 7 | do | Br. Stock | do | 13.7 | 25,000 (Ext.) | 5,400 (Ext.) | 355 | +27 | +80 | | | | 2.18 |
| 8 | do | Neutral | do | 13.3 | 340 | 138 | 46.4 | −32 | +35 | | | 0.13 | 2.45 |
| 9 | Sante Fe Springs | do | do | 10.2 | | | 371 | | +65 | 520 | | | |
| 10 | Texas | | Furfural | 13.0 | | | 1,500 | | +85 | 470 | | | |
| 11 | Penn | | Chlorex | 12.2 | | | 1,365 | | +85 | 560 | | | |
| 12 | do | | Nitrobenzene | 10.0 | | | 1,500 | | +75 | 555 | | | |
| 13 | Mid-Cont | | Propane-Cresol | 14.4 | | | 1,500 | | +100 | 540 | | | |
| 14 | do | | Phenol | 13.6 | | | 41.7 | −82 | +20 | | | | |
| 15 | do | | Chlorex | 13.6 | | | 200 | −61 | +75 | | | | |
| 16 | do | | Phenol | 8.9 | | | 569 | | +75 | | | | |
| 17 | do | | Furfural | 14.9 | | | 50.2 | 25 | +20 | 380 | 4.13 | 0.11 | 2.05 |
| 18 | Van Zandt | Neutral | Phenol | 17.0 | 159.4 | 81.5 | 40.7 | −24 | +35 | 375 | 3.80 | 0.16 | 2.10 |
| 19 | do | do | do | 17.0 | 161.3 | 82.4 | 40.7 | −27 | +35 | 365 | 4.40 | 0.16 | 2.12 |
| 20 | do | do | do | 16.5 | 176.4 | 87.3 | 41.4 | −24 | +35 | 415 | 7.1 | 0.54 | 2.85 |
| 21 | do | do | do | 10.8 | 132.7 | 39.7 | 65.4 | −71 | +35 | 410 | 9.4 | 0.56 | 3.21 |
| 22 | do | do | do | 7.9 | 219.2 | 56.5 | 73.2 | −133 | +25 | 455 | 6.12 | 1.48 | 2.71 |
| 23 | do | do | do | 10.9 | 394.8 | 99.3 | 103.6 | −69 | +45 | | | | |

As is well known in the art, such solvent extracts are obtained in the manufacture of lubricating oils from crude oils by distillation of the reduced crude to form neutral distillates and residua which are subjected to solvent extraction. Both extracts from neutral oils and residua, that is, residua used in the preparation of bright stocks, may be used in accordance with this invention. Since the procedure is well known and the general characteristics of the extract material are substantially the same for both the treatment of neutrals and bright stocks to obtain these solvent extracts, non-limiting examples relating to both are given.

A desalted crude oil is first charged to a distillation unit where straight run gasoline, two grades of naphtha, kerosene, and virgin distillate are taken off, leaving a reduced crude residue. The reduced crude is continuously charged to a vacuum distillation unit where three lubricating oil distillates (neutrals) are taken off as side streams, a light distillate is taken off as overhead, and a residuum is withdrawn from the bottom of the tower. This residuum is charged to a propane deasphalting unit wherein propane dissolves the desirable lubricating oil constituents and leaves the asphaltic materials. A typical vacuum residuum charge to the propane deasphalting unit may have an API gravity of 12.9°, viscosity SUS at 210° F. of 1249, flash 585° F., fire 650° F., C.R. of 13.9 weight percent and is black in color. The deasphalted oil may have an API gravity of 21.5° to 21.8°, viscosity SUS at 210° F. of 165–175, NPA color 6–7, flash 575° F., fire 640° F., and C.R. of 1.7–2.0%. The deasphalted oil and various neutral distillates from the reduced crude are separately subjected to solvent extraction for the separation of non-aromatic from aromatic constituents. The refined oils or "raffinates" from such fractions are used as lubricating oil blending stocks and the solvent extracts, containing the aromatic constituents, are the materials found useful in accordance with this invention.

For example, a Van Zandt crude oil with an API gravity of 33.1 was topped to remove such light fractions as gasoline, naphtha, kerosene, and a light lubricating distillate. The vacuum residue was a reduced crude having a viscosity of 1251 SUS at 210° F., 2.2 percent sulfur, and an API gravity of 12.6. After propane deasphalting, the oil had a viscosity of 174 SUS at 210° F. and an API gravity of 21.7. This deasphalted oil was treated with phenol in the ratio of 3.5 vols. of phenol to 1.0 vol. of oil to produce a raffinate from which an aviation lubricating oil may be produced. The extract phase from this phenol treatment is ready for use in preparing soluble oils in accordance with this invention.

In obtaining extracts from neutral distillates the following is illustrative: A crude oil having an API gravity of 35.0–36.0, a viscosity at 210° F. of 46–47 SUS, a pour point of −60° F., and containing 0.8 to 0.95% sulfur is treated in a vacuum distillation unit to yield a neutral oil having an API gravity of 27–28°, flash point 360°–370° F., viscosity at 100° F. 90–93 SUS, viscosity at 130° F. of 60–63 SUS, viscosity at 210° F. of 37–39 SUS, pour point +60° F., carbon residue (Ramsbottom) 0.06–0.08 wt. percent, V.I. 65–68, 0.95–1.10 wt. percent sulfur and a neutralization number (1948) of 2.3–2.5. Light neutral distillates having these characteristics are subjected to solvent extraction in a manner similar to that of the treatment of bright stocks to form a finished raffinate and an extract phase. Heavier neutral distillates may also be treated to solvent extraction. Thus, extracts 18, 19 and 20 of Table II were prepared from the manufacture of a neutral distillate having a viscosity at 100° F. of 80 SUS and a V.I. of 100. Extract 21 was prepared from the manufacture of a neutral oil having a viscosity of 170 SUS at 100° F. and a V.I. of 100. Extract 22 was prepared from the manufacture of a neutral having a viscosity at 100° F. of 200 SUS and a V.I. of 85. Extract 23 was prepared from the manufacture of a neutral having a viscosity at 100° F. of 350 SUS and a V.I. of 100.

When using phenol, it is possible to vary the characteristics of the extraction product, within limits, by adjustment of the amount of water present. A low V.I. product may be obtained by using a water solution of phenol during the extraction and a high V.I. product may be obtained by using anhydrous phenol. Essentially, however, these extracts are predominately aromatic in character, regardless of the treating conditions employed.

Although it is contemplated that the present compositions may contain mineral oil alone, or solvent extracts alone, mixtures of mineral oil and solvent extracts may also be used. Since the mineral oil and the solvent extracts contain differing amounts of acidic materials, and since blend and emulsion stability are directly related to the acid number of our blend, proper acidity of the completed composition must be maintained.

In addition, the extender (abietic acid-oleic acid mixture) and the proportion of alkali influence the adjustment and final acidity of the composition. Any variations in the acid number contribution factor of these ingredients must be taken into account in compounding the formulations. If the acid number of any one component is lower than a particular standard calculated to give a total theoretical acid number of the formulation of the desired value of about 1.44 or within the range of 1.2 to 1.6, more of that component will be needed within certain prescribed limits which have been found to apply.

To illustrate, the total "acid number contribution factor" of 3.0 wt. percent of Flextal 37 having an acid number of 166 is 4.98 and that of 88.54 wt. percent phenol extract having an acid number of 4.13 would be 3.66, or a total contribution of 8.64 acid number. Upon addition of 0.72% KOH, the theoretical acid number would be 1.44. If the acid number of the extract is below 4.13 a sufficient additional amount of Flextal 37 must be added. If the acid number of the Flextal 37 is below 166, an additional amount of Flextal 37 must also be added to maintain the balance. However, not all of the acidity of the solvent extract can be replaced by the Flextal 37 and not all of the acidity of the Flextal 37 can be replaced by additional extract. The acid number of the Flextal can vary from about 165 to 170 and the acid number of the solvent extract can vary from 3.0 to 5.8. Within these limits of the acid number, adjustment of the total acidity by the foregoing procedure is applicable.

In addition to the foregoing considerations, another effect, the dilution of the extract with neutral lubricating oil, as is often desirable, must be taken into account. The acidity of the solvent extracts is due to their content of naphthenic acids as is well-known. If a neutral oil alone is used, the "acid number contribution factor" thereof may be maintained by the addition of naphthenic acids extracted from the solvent extracts. The naphthenic acids extracted from phenol extracts No. 18, 19 and 20 of Table II have an average molecular weight of 354 and an acid number of 158. Those obtained from extract No. 21 have an average molecular weight of 418 and an acid number of 134. Other naphthenic acids having molecular weights ranging from 297–330 and acid numbers of from 178 to 159, respectively, may be used for this purpose.

When only solvent extract is used in the compositions of this invention, the upper limit of the viscosity at 100° F. is preferably not more than about 600 SUS. Higher viscosity solvent extracts may be used successfully when diluted with a lower viscosity mineral oil, but if this is done, the acidity must be balanced by the addition of naphthenic acids as described above. Extracts from the preparation of both bright and neutral stocks may be used if blended to the limits previously described. In Experiments I to III, extract number 18 in Table II was used as the extract in preparing formulations used to demonstrate the invention. This extract has an acid number of 4.13. The preferred range of physical characteristics of the solvent extracts found to be most useful comprises: API gravity, 16 to 17.2; flash, 365° to 385° F.; fire, 425° to 435° F.; vis./100° F., 159.4 to 176.4; V.I., minus 20 to 27; and acid numbers, 3.0 to 6.0.

In compounding soluble oil blends, it is necessary to use sufficient water to carry the alkali into solution, and yet not so much as to cause gelling or stratification problems with the blend at reduced or elevated temperatures. The alkali reacts with the fatty and rosin acids to form soaps. The same reaction applies to the naphthenic acids added as such, or present in the extract. Not all of these acids are neutralized, since the end-product is characterized with an acid number of approximately 1.4. It is possible through various modifications of the formulation to achieve acid numbers of 15 and more. As to the composition of the present invention, the general range of constituents may be as follows:

Table III

| Component | Range in Wt. Percent |
|---|---|
| Emulsifier (sodium petroleum sulfonates) | 3.0 to 30.0 |
| Rosin and Fatty acids | 2.0 to 4.0 |
| Coupling agent | 0.4 to 5.0 |
| Alkali | 0.3 to 1.0 |
| Water | 0.5 to 2.0 |
| Chlorinated wax-phenol cond. prod | 0.2 to 0.5 |
| Mineral oil plus naphthenic acids and/or solvent extract | 57.5 to 93.6 |

The chlorinated wax-phenol condensation products used in the compositions of this invention are stable alkyl-substituted oxyaromatic compounds prepared by reacting together a chlorinated alkyl compound having a molecular weight about that of petroleum wax, and containing about 12 to 14 percent chlorine, and an oxy-aromatic compound. The alkyl compound is preferably a paraffin wax having a melting point of approximately 120° F. to 130° F. and a molecular weight of about 300. Materials like petrolatum and wax distillate having short alkyl groups or low melting points are not to be used in making these products, according to O. M. Reiff in Patent 2,191,-499. Chlorination of the wax takes place at about 200° F. and from 12% to 14% of chlorine is incorporated in order to obtain the desired stability and oil-solubility. The condensation with phenol, naphthols, anthrols and similar oxy-aromatic compounds takes place at about 150° F. i.e., at a temperature just over the melting point of the wax. One molecular proportion of the phenol to a sufficient proportion of chlorowax to produce four atomic proportions of chlorine is used. The admixed phenol and chlorowax at 150° F. are condensed in the presence of about 3% by weight of anhydrous aluminum chloride, and the temperature is held at this level by controlled addition of the catalyst. Following this, the temperature is slowly raised to about 250° F. and finally to about 350° F. until the evolution of hydrogen chloride subsides. The preferred product useful in accordance with the present invention, after purification by hydrolysis to remove the aluminum chloride, and water washing, has a pour point of about 90° F. and a mean molecular weight of about 1000.

The preferred soluble oil blend of this invention as set forth in Experiment II has the following composition:

Table IV

| Component | Wt. Percent |
|---|---|
| Petronate | 4.85 |
| Flextal 37 (acid number of 166) | 3.00 |
| Diethylene glycol (18.35%)+hexylene glycol (81.65%) | 1 1.40 |
| Potassium hydroxide | .72 |
| Water | .99 |
| Phenol extract (#18 from Table I, acid number of 4.13) | 88.54 |
| Phenol-chlorowax cond. prod. (P.P. 90° F.) | 0.50 |

1 May be added as 1.40% diethylene glycol.

What is claimed is:

1. A soluble oil blend comprising about 30.0 to 3.0 weight percent of an alkali metal petroleum sulfonate emulsifier, about 2.0 to 4.0 weight percent of a mixture comprising rosin acids and fatty acids, about 0.4 to 5.0 weight percent of an alcoholic coupling agent, about 0.3 to 1.0 weight percent of alkali selected from the group consisting of sodium hydroxide and potassium hydroxide, about 0.5 to 2.0 weight percent of water, about 0.2 to 0.5 weight percent of a chlorinated wax-phenol condensation product and about 57.5 to 93.6 weight percent of aromatic solvent extract from the manufacture of a mineral lubricating oil.

2. A soluble oil blend in accordance with claim 1 in which the chlorinated wax-phenol condensation product is characterized by having a pour point of about 90° F. and a mean molecular weight of about 1000.

3. A soluble oil blend in accordance with claim 1 in which the emulsifier comprises sodium petroleum sulfonates.

4. A soluble oil blend in accordance with claim 1 in which the aromatic solvent extract has an API gravity of 16 to 17.2, a viscosity at 100° F. of from 159.4 to 176.4 SUS, a V.I. of from −20 to −27, and an acid number of from 3 to 6.

5. A soluble oil blend in accordance with claim 1 in which the coupling agent is a mixture comprising diethylene glycol and hexylene glycol.

6. A soluble oil blend in accordance with claim 1 in which the coupling agent is diethylene glycol.

7. A soluble oil blend comprising about 4.85 weight percent of oil-soluble sodium petroleum sulfonates (62% assay), about 3.0 weight percent of a mixture of acids consisting of 37 percent abietic acid and 63 percent oleic acid and linoleic acid, about 1.4 weight percent diethylene glycol, about 0.72 weight percent of potassium hydroxide, about .99 weight percent of water, about 0.5 weight percent of a phenol-chlorowax condensation product having a pour point of about 90° F., and about 88.54 weight percent of phenol extract from the manufacture of mineral lubricating oil having a viscosity at 100° F. of 159.4 SUS and a sulfur content of about 2.05 percent, said composition being characterized by its emulsibility with water at temperatures of 40° F. and lower.

8. The method of dispersing soluble oils in water and preventing phase separation at temperature of 40° F. and lower, said soluble oils being compositions consisting of an alkali metal petroleum sulfonate emulsifier, alkali metal soaps of rosin and fatty acids, an alcoholic coupling agent, water and an aromatic solvent extract from the manufacture of mineral lubricating oils, which comprises incorporating in said soluble oil compositions about 0.2 to 0.5 weight percent based on the total weight of said soluble oil compositions of a phenol-chloro wax condensation product before admixture of said soluble oil compositions with water.

References Cited in the file of this patent

UNITED STATES PATENTS

| | | |
|---|---|---|
| 2,147,545 | Reiff | Feb. 14, 1939 |
| 2,340,035 | Zimmer et al. | Jan. 25, 1944 |
| 2,552,913 | Waugh | May 15, 1951 |